United States Patent [19]
Marshall et al.

[11] Patent Number: 5,222,996
[45] Date of Patent: Jun. 29, 1993

[54] BUOY LAUNCH CONTAINER EXTENDER

[75] Inventors: Frank P. Marshall, Penns Park; Bruce W. Travor, Holland; Saroja Mahadevan, Abington, all of Pa.

[73] Assignee: The United States of America as represented by the Secretary of the Navy, Washington, D.C.

[21] Appl. No.: 932,448

[22] Filed: Aug. 19, 1992

[51] Int. Cl.⁵ .................................................. B64D 1/12
[52] U.S. Cl. .................................... 244/137.4; 89/1.51
[58] Field of Search ......................... 89/1.51, 1.54, 1.56, 89/1.57, 1.59, 29; 42/77; 244/137.40, 137.3, 137.1

[56] References Cited

U.S. PATENT DOCUMENTS

| 2,470,120 | 5/1949 | Walker | 89/1.54 |
| 3,618,250 | 11/1971 | Grandy | 89/29 |
| 4,172,407 | 10/1979 | Wentink | 89/1.56 |
| 4,423,660 | 1/1984 | Ouellette | 89/1.51 |
| 4,642,928 | 2/1987 | Bertiller et al. | 89/29 |

Primary Examiner—Joseph F. Peters, Jr.
Assistant Examiner—Christopher P. Ellis
Attorney, Agent, or Firm—James V. Tura; James B. Bechtel; Susan E. Verona

[57] ABSTRACT

A launch-chute extender is disclosed that snap-fits onto the end of a buoy container in an aircraft that carries stores internally. This extender, by adding its tubular configuration to the end of the buoy container, provides guiding clearance to selected stores to enable them to exit from the underside of the aircraft without becoming jammed.

7 Claims, 3 Drawing Sheets

BUOY LAUNCH CONTAINER EXTENDER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The instant invention relates to the devices on-board an aircraft that allow the physical passing of an object through the aircraft belly, such as a cylindrical tube, from a position inside the craft to one outside.

In many instances, when aircraft are patrolling the oceans, it may be necessary to launch objects, such as sonobuoys or flares, from an inner compartment, through the aircraft's underside skin, to the outside. Some aircraft are fitted with a internal pressurized launch chutes that extend from just inside the cabin area to a position adjacent to the inside of the aircraft skin. A mechanically-operated door, acting in place of the skin, moveably covers and uncovers the opening and allows the object to be fired by either hydraulic or pneumatic means, into the surrounding atmosphere.

Of course, during this time, the aircraft is flying at a predetermined altitude and airspeed and there can be quite a lot of turbulent airflow adjacent the aircraft's skin or within the area adjacent the ends of the launch tubes. In designing the area to hold the launch chutes, a selected amount of space between the mechanical door and the end of a launch container was chosen to aid in the construction of the aircraft. At the time of aircraft design, the approximate size of the buoy, such as a sonobuoy, was known (it was a 3 foot long tubular object) and it was determined that this size would launch without difficulty. The container was long enough so that as the lead end of a buoy started into the cavity between the aircraft skin and the end of the container, the trailing end of the buoy was still positioned in the launch container, thus ensuring that the total length of the buoy would not be jostled out of position and would pass on through without mishap. As times progressed, the size of the sonobuoy decreased to a point where the buoy was now physically small enough so that it could get caught inside the cavity space. If this event occurred, the automatic cover over that particular launch chute could be prevented from closing and the cover-motor could even burn out. This left a very undesirable flight condition.

SUMMARY OF THE INVENTION

It is therefore an object of the present invention to provide a means to facilitate the launching of smaller-sized objects from an aircraft's automatic launch tubes.

It is another object of the present invention to facilitate the launching with the least costly means possible.

It is still another object of the present invention to provide a means to facilitate the launching of a buoy that can be integrated into existing equipment without requiring extensive modification thereof.

These and other objects and many attendant advantages of the present invention are obtained where a tubular, launch chute extender is available to "snap lock" onto the base of an individual launch container that is fitted inside a launch chute in an aircraft. At the inner-most end of the extender, at least two spring-tensioned lugs extend beyond the rim and snap into specially-shaped apertures located in appropriate places near the end of a launch container. In addition, the rim of the extender has a plurality of stabilizing protrusions extending therefrom to mate with similarly-shaped cavities in the end of the container. Finally, at the opposite, discharge end of the extender, the rim has been bevelled to allow clearance for the moving cover while still providing guidance to the moving buoy.

The novel features which are believed to be characteristic of the invention both as to its organization and methods of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration and description only and are not intended as a definition of the limits of the invention.

DETAILED DESCRIPTION OF THE PREFERRED EMBODIMENT

As technology has progressed, achievements in the electronics industry have allowed the miniaturization of many parts or objects used by the services, such as sonobouys. Although the downsizing of the buoys has been achieved, a similar change in the size of the functional, associated equipment was not undertaken. This meant that in some cases, the sections of the aircraft used to carry and launch the buoys, when the much smaller buoys were to be used, were physically too large to do the job properly.

Figure 1:
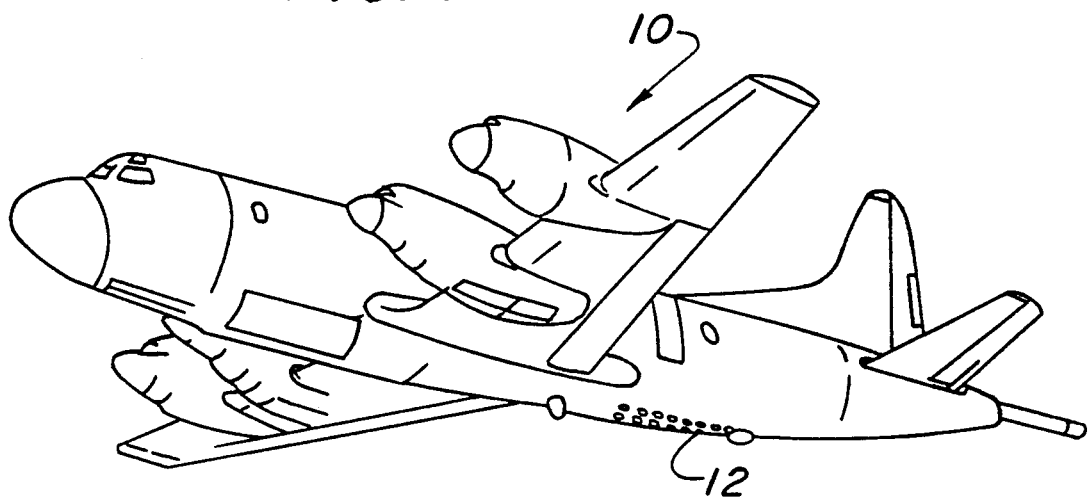
FIG. 1 shows a perspective view of an aircraft having a launch area to dispense stores.
Figure 2:
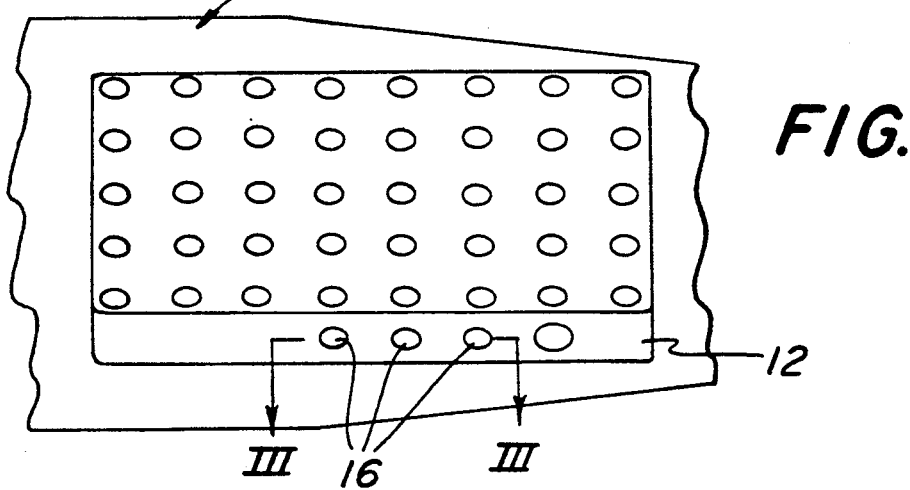
FIG. 2 shows an enlarged, fragmentary plan view of the launch area.
Figure 3:
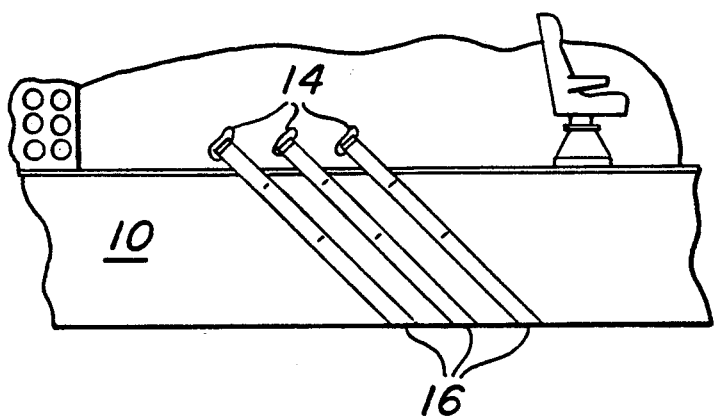
FIG. 3 shows a partially fragmented cross-sectional view through the length of the aircraft showing a plurality of launch chutes.

Referring now to the drawings, wherein like reference characters designate like or corresponding parts throughout the several views, FIG. 1 shows a perspective view of the area 12 of the underside an aircraft 10 where small sonobuoys or flares are launched from. FIG. 2 shows a plan view of this area 12, as taken from underneath the aircraft 10, and FIG. 3 shows a partially fragmented cross-sectional view of area 12, taken along the length of aircraft 10, showing a plurality of aircraft launch chutes 14 with buoy launch containers 16 therein. Prior to flight, individual buoys 18 (see FIG. 4) are loaded into containers 16 and they are secured in launch chutes 14.

Figure 4:
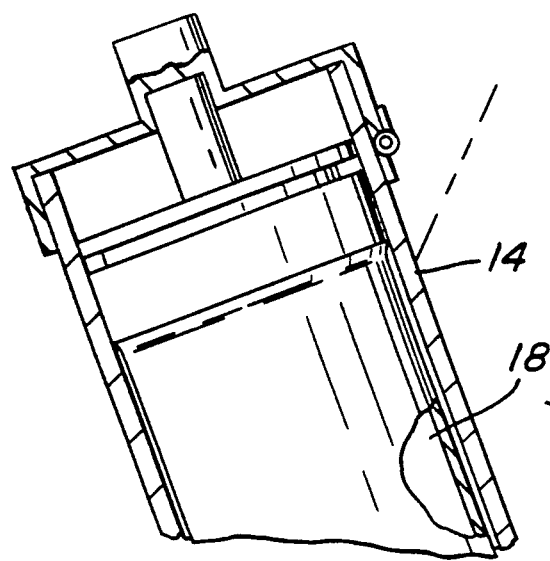
FIG. 4 shows a cross-sectional view of one of the launch containers, as taken along its longitude, showing a launch tube extender attached.
Figure 5:
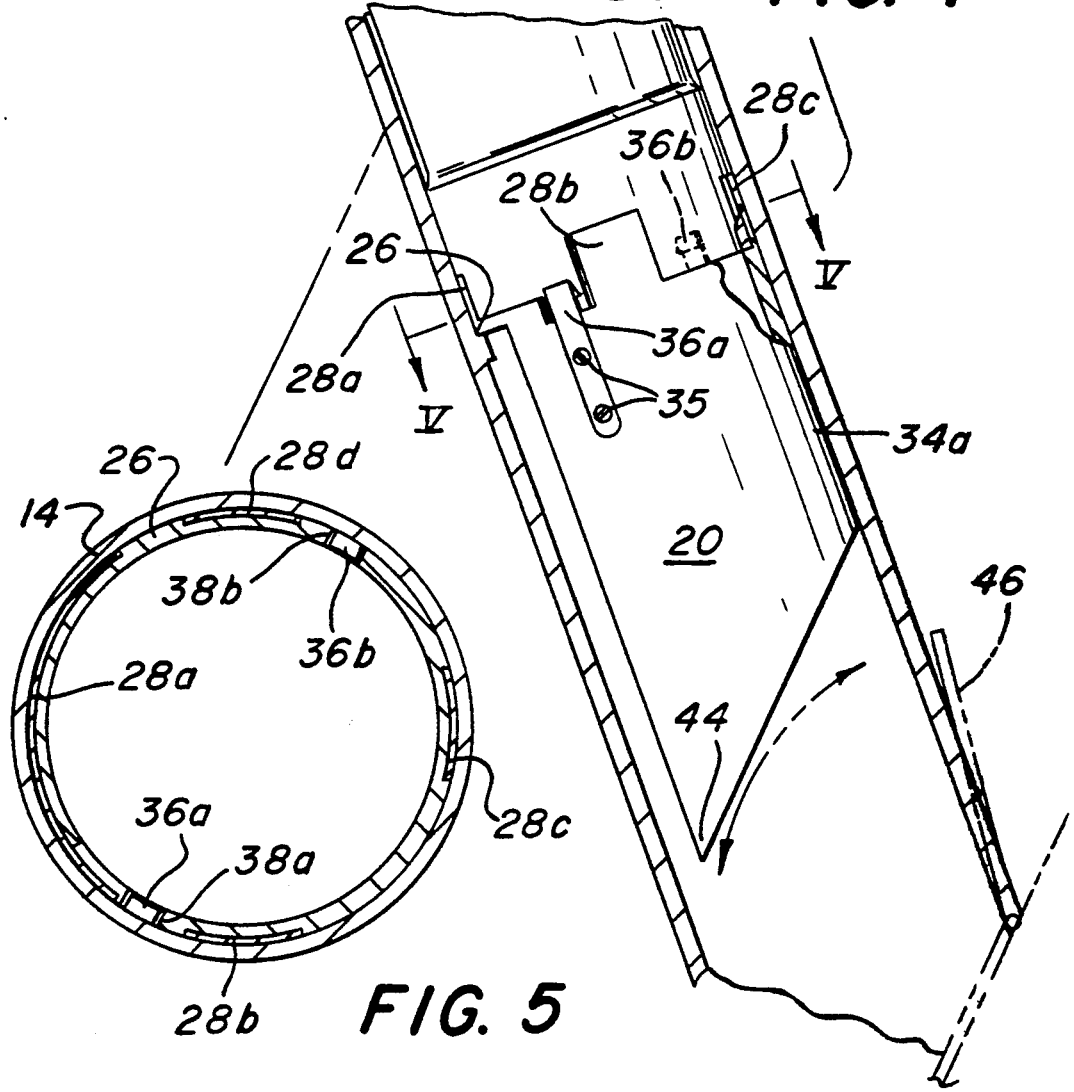
FIG. 5 shows a cross-sectional view of the interface between the launch tube and the tube extender.

FIG. 4 shows an isolated cross-sectional view of one of the launch containers 16 with the instant invention, a launch tube extender 20, attached. FIG. 5 is a cross-sectional view, taken along lines V—V of FIG. 4, of the junction of extender 20 to the outboard edge of launch container 16 and FIG. 6 shows an expanded perspective view of extender 20 as it is attached to the end of launch container 16.

Figure 6:
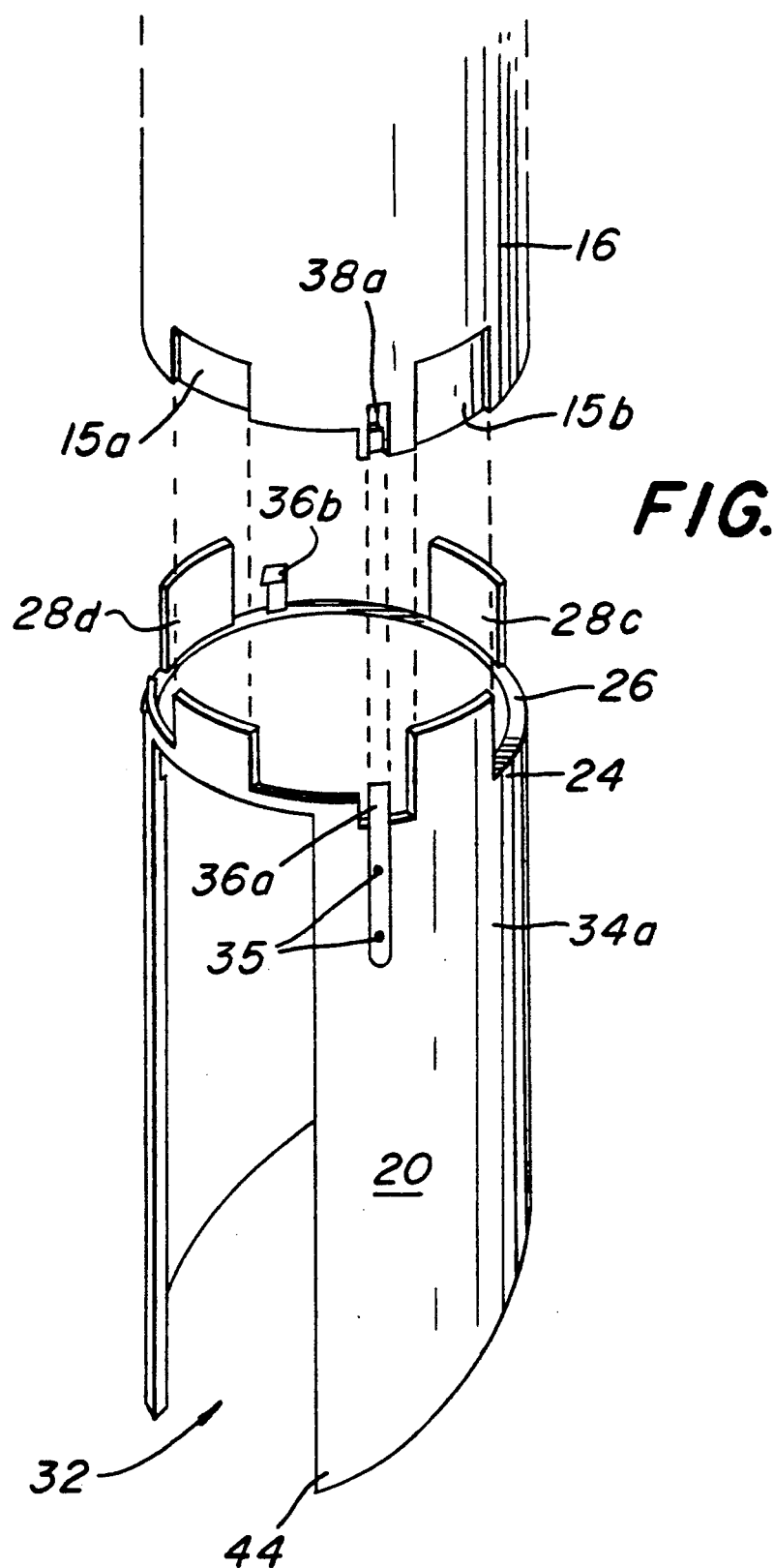
FIG. 6 shows an expanded perspective view of the end of the launch tube and the launch tube extender.

As seen more clearly in FIG. 6, extender 20 is a tubular piece having an inwardly extending end 24 and an outwardly extending end 44. The rim 26 of inner end 24 has four rectangular-shaped, alignment tabs 28a–d extending therefrom off the edge of extender 20 in an axial direction to mate with corresponding openings 15a–d, respectively, (only 15a and 15b shown in FIG. 6) in the lower end of container 16. Extending from immediately adjacent rim 26 longitudinally throughout the full length of the extender is a slot 32, that allows extender 20 to fit over a protrusion in the aircraft (not shown in FIG. 6) Slot 32 is formed by removal of tube material around an arc of between 60 and 65 degrees centered on the extender's maximum longitudinal axis. Extender 20 also has a pair of elongated snap lugs 34a,34b positioned diametrically opposite one another and imbedded into the surface of inward end 24. Lugs 34a,b are formed from flexible elongated strips of hardened aluminum that, at one end, are fastened, such as by sheet metal screws, or other suitable fasteners, 35 to the sides of extender, and at the other ends, have small hooks or flanges 36a,36b, respectively. Flanges 36a,b are constructed to "snap-fit" into appropriately-sized apertures 38a,38b cut in the bottom end of launch container 16. Outwardly-extending end 44 is beveled to a bias cut to allow clearance when aircraft door 46 (seen in phantom in FIG. 4) swings open.

Extender 20 is designed to be installed onto the end of launch container 16 before the container is loaded onto an aircraft. The fit of extender 20 when sealed onto a launch container 16 must not exceed the outside diameter of container 16. When a buoy is fired, after the aircraft door is opened, it is guided from the end of container 16, through extender 20, out of the aircraft and into the airstream without finding space for jamming. Extender 20 can be designed to be taken off of an empty container 16 and reused or be disposed of when the container is discarded.

Finally, while the chute extender has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What is claimed is:

1. A store launch chute extender comprising:
    a two-ended tubular piece having an inwardly-extending end and an oppositely-disposed, outwardly-extending end;
    a rim section on the inwardly-extending end with a plurality of alignment means extending therefrom and a plurality of latching means adjacent thereto;
    a biased-wall section at the outwardly-extending end; and
    a slot cut longitudinally from immediately adjacent said rim section substantially through-out the tubular piece and said biased wall section.

2. An extender as described in claim 1 wherein each said plurality of alignment means comprises a tab extending, in the same plane as the tubular section, away from said rim.

3. An extender as described in claim 2 wherein said tabs have flattened end surfaces.

4. An expander as described in claim 1 wherein each said plurality of latching means comprises a longitudinally-extending strip having a body, at one end, fixedly attached to the outer walls of the piece adjacent said rim section and an oppositely-disposed flexible free end having a hooking means thereon.

5. An extender as described in claim 4 wherein said hooking means comprises a flange.

6. A launch chute extender, to add additional store-launching guidance, to fit on the outboard end of a buoy container in an aircraft, comprising:
    a. a tubular section having an open, in-board end with an edge surrounding said end for fitting adjacent the outboard end of a buoy container and an oppositely disposed and spaced-apart open, outboard end;
    b. at least two substantially rectangular-shaped fitting tabs extending from the edge in the same curvilinear plane as said section;
    c. at least two elongated spring-latching tabs affixed to the outside of the section walls and extending beyond the edge and having hooks at their distal ends;
    d. a biased-cut on the open, outboard end to provide a slanted edge thereon; and
    e. a slot cut through the section from the open, outboard end to adjacent the edge of the inboard end.

7. A launch chute extender as described in claim 6 wherein the fitting tabs are thinner than the thickness of the section.

* * * * *